United States Patent [19]

Ballard et al.

[11] Patent Number: 4,762,656

[45] Date of Patent: Aug. 9, 1988

[54] METHOD FOR HOT PRESSING BERYLLIUM OXIDE ARTICLES

[75] Inventors: Ambrose H. Ballard; Thomas G. Godfrey, Jr., both of Oak Ridge; Erb H. Mowery, Clinton, all of Tenn.

[73] Assignee: The United States of America as represented by the United States Department of Energy, Washington, D.C.

[21] Appl. No.: 917,460

[22] Filed: Oct. 10, 1986

[51] Int. Cl.[4] ............................................. C04B 35/08
[52] U.S. Cl. ..................................... 264/82; 264/332; 501/94
[58] Field of Search ............... 264/332, 82; 501/94; 423/421

[56] References Cited

U.S. PATENT DOCUMENTS 2,413,644 12/1946 Nicholson ........................... 423/421
3,529,046 9/1970 Hendricks ........................... 264/332

Primary Examiner—James Derrington
Attorney, Agent, or Firm—Earl L. Larcher; Stephen D. Hamel; Judson R. Hightower

[57] ABSTRACT

The hot pressing of beryllium oxide powder into high density compacts with little or no density gradients is achieved by employing a homogeneous blend of beryllium oxide powder with a lithium oxide sintering agent. The lithium oxide sintering agent is uniformly dispersed throughout the beryllium oxide powder by mixing lithium hydroxide in an aqueous solution with beryllium oxide powder. The lithium hydroxide is converted in situ to lithium carbonate by contacting or flooding the beryllium oxide-lithium hydroxide blend with a stream of carbon dioxide. The lithium carbonate is converted to lithium oxide while remaining fixed to the beryllium oxide particles during the hot pressing step to assure uniform density throughout the compact.

4 Claims, 2 Drawing Sheets

METHOD FOR HOT PRESSING BERYLLIUM OXIDE ARTICLES

This invention was made as the result of work under Contract W-7405-ENG-26 between Union Carbide Corporation, Nuclear Division, and the U.S. Department of Energy.

BACKGROUND OF THE INVENTION

The present invention relates generally to the formation of beryllium oxide articles by a pressure-sintering operation and, more particularly, to the method of forming such articles wherein a sintering aid of lithium in an improved form is employed for facilitating the sintering of beryllium oxide particulates.

The formation of beryllium oxide (BeO) articles is conventionally achieved by hot pressing beryllium oxide powder into the desired configuration. A sintering aid such as lithium oxide was often blended with beryllium oxide powder prior to the pressing operation to facilitate the sintering of the beryllium oxide particulates for providing an article of near theoretical density at significantly lower temperatures and pressures than attainable without the use of a sintering aid.

The lithium oxide was preferably introduced into the beryllium oxide powder as lithium hydroxide from an essentially saturated aqueous solution. The concentration of the lithium hydroxide in the aqueous solution was sufficient to coat essentially each beryllium oxide particulate with lithium hydroxide. Normally, lithium hydroxide in the aqueous solution was in a concentration of about 4 to 18 wt. % which provided a lithium hydroxide equivalent to lithium oxide ($Li_2O$) of about 2.5 to 11 wt. %, a 10 wt. % addition of which was used for blending purposes. The blending of the beryllium oxide powder with the lithium hydroxide caused the beryllium oxide particulates to be coated with lithium hydroxide. During the hot pressing operation, the water was evaporated from the aqueous solution and the lithium hydroxide converted to lithium oxide which was then combined with the beryllium oxide to form a small amount of lithium beryllate. The presence of this beryllate caused formation of a small amount of a liquid phase (eutectic) at about 870° C. which markedly aided in the densification of the beryllium oxide body.

While the use of lithium hydroxide provided for lower hotpressing temperature and pressures, some shortcomings were present which detracted from the use of this sintering aid. For example, it is believed that a significant amount of the lithium hydroxide becomes depleted locally by leaching or wicking through an evaporation-condensation mechanism during the hot pressing operation. As a result of this depletion, the hot pressing of some configurations such as those that require the use of a closed-end die assembly causes a markedly different visual appearance to occur at the free end of the hot-pressed article as compared to the rest of the article. In addition to such cosmetic effects, it has been found that undesirable density gradients are present throughout the hot pressed article with these den-density gradients apparently being caused by the migration and depletion of the lithium hydroxide. These density gradients are frequently responsible for the rejection of hot-pressed articles of beryllium oxide which significantly increases production costs.

Summary of the Invention

Accordingly, it is the primary objective or aim of the present invention to provide for the hot pressing of beryllium oxide articles of near theoretical density with negligible density gradients due to depletion or migration of the sintering aid used in the hot-pressing operation. As with previous practices, the sintering aid of lithium oxide is blended or combined with the beryllium oxide powder as lithium hydroxide in a aqueous solution. In accordance with the present invention, this lithium hydroxide is contacted with carbon dioxide and converted to lithium carbonate which is immobile and relatively insoluble in water. During the hot pressing operation, the lithium carbonate is converted to lithium oxide for facilitating the sintering of the beryllium particulates. This retention of the sintering aid in place within the blend during the various hot-pressing steps assures the uniform distribution of lithium oxide in the beryllium oxide particulate blend throughout the entire hot pressing operation so as to eliminate or significantly reduce the undesirable density gradients heretofore encountered.

Generally the method of the present invention for hot pressing high density articles of beryllium oxide comprises the steps of forming a homogeneous mixture of about 98.5 to 99.5 wt. % of beryllium oxide particulates and sufficient lithium hydroxide to provide about 0.25 to 1.5 wt. % equivalent of lithium oxide. This mixture is contacted or flooded with gaseous carbon dioxide for a sufficient duration to convert the lithium hydroxide to lithium carbonate. Thereafter the mixture is hot pressed into an article of the desired configuration with the lithium carbonate being converted to lithium oxide to assist in the sintering of the beryllium oxide particulates. This hot pressing step is characterized by the lithium carbonate being uniformly dispersed throughout the mixture and affixed to beryllium oxide particulates so that during the hot pressing step the lithium oxide formed from the lithium carbonate can provide essentially uniform sintering of the beryllium particulates.

Other and further objects of the invention will be obvious upon an understanding of the illustrative method about to be described or will be indicated in appending claims, and various advantages not referred to herein will occur to one skilled in the art upon employment of the invention in practice.

Figure 1:
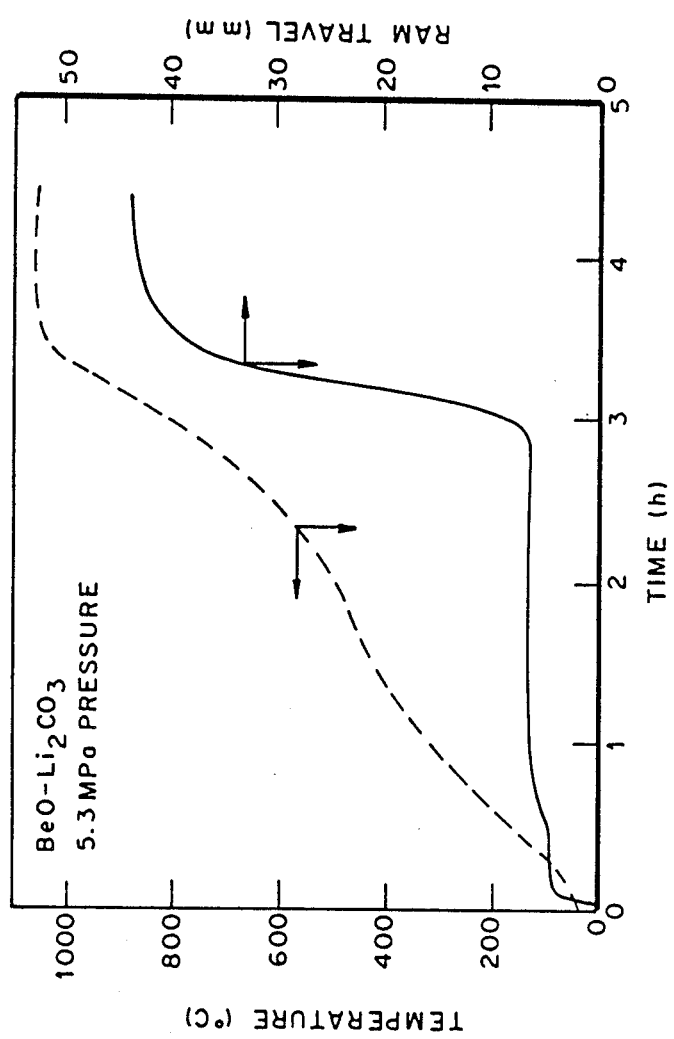
FIG. 1 is a graph of data obtained for a typical pressure-sintering operation of a beryllium-lithium carbonate mixture in accordance with the present invention.

The graph shown in FIG. 1 is for the purpose of illustration and description. Other data of the pressure-sintering operation may be achieved by utilizing different concentrations of the sintering aid and hot-pressing parameters. Therefore, the graph illustrated is not intended to be exhaustive or to limit the invention to the precise data illustrated. This data is merely chosen and described in order to best explain the principles of the invention and their application in practical use to enable others skilled in the art to best utilize the invention.

Detailed Description of the Invention

As briefly described above, the present invention is directed to a method for hot-pressing beryllium oxide powder with a lithium oxide sintering aid to provide hot-pressed articles exhibiting improved density uniformity. In accordance with the present invention, the homogeneous distribution of the sintering aid of lithium oxide in the beryllium oxide powder blend is accomplished by mixing lithium hydroxide in an aqueous solution with the beryllium oxide powder as heretofore practiced so as to coat essentially each beryllium oxide particulate with lithium hydroxide. The present invention differs from the prior art practice in that this uniformly distributed but mobile lithium hydroxide is contacted with a stream of gaseous carbon dioxide which converts the lithium hydroxide in situ on the surface of the beryllium oxide particulates to lithium carbonate which is essentially immobile. The lithium carbonate is converted to lithium oxide but remains uniformly dispersed in the beryllium oxide powder during the hot-pressing operation. Also, the heretofore encountered evaporation-condensation mechanism associated with aqueous lithium hydroxide is present but does not alter the distribution of the immobile lithium carbonate during drying or the hot-pressing operation. The beryllium oxide particulates employed in the present invention are in a size range of about 0.1 to 10 $\mu$m and of a purity in the range of about 99.5 to 99.9 percent.

The lithium hydroxide is in an aqueous solution in a concentration of about 4 to 18 wt. % which provides about 0.25 to 1.5 wt. % of a lithium oxide equivalent in the beryllium oxide body. It is believed that with less than about an 0.25 wt. % of the lithium oxide equivalent in the form of lithium hydroxide an insufficient concentration of the sintering aid will be present to adequately coat the beryllium particulates for effecting uniform sintering of the particulates. On the other hand, a concentration of greater than about 1.5 wt. % of lithium oxide equivalent in the form of lithium hydroxide is believed to significantly reduce the purity of the beryllium oxide compact so as to detract from the properties desired in the beryllium oxide articles.

The blending of the beryllium oxide particulates and the lithium hydroxide in the aqueous solution is achieved in a suitable mixing apparatus such as a blade or paddle-type blender commonly used for mixing powders and aqueous solutions.

The contacting of the beryllium oxide-lithium hydroxide (aqueous solution) mixture with gaseous carbon dioxide can be readily achieved by bubbling a stream of carbon dioxide through the mixture to flood the mixture with the carbon dioxide for converting virtually all the lithium hydroxide to lithium carbonate. Normally, this flooding is maintained for a duration of about 30 to 120 min. which is sufficient for effecting the desired conversion.

The hot pressing of the beryllium oxide is achieved in any suitable hot pressing mechanism such as a die assembly used for forming hollow configured articles. Beryllium oxide mixtures containing the sintering aid of the present invention may be hot pressed into articles of near theoretical density at a temperature in range of about 950° to 1050° C. and at a pressure of about 5 to 10 MPa.

In order to provide a more facile understanding of the present invention, examples are set forth below relating to the hot pressing of beryllium oxide articles. The first example is a demonstration of the present invention while the second example is directed to the demonstration of a prior art technique using a lithium oxide sintering aid so that the differences between the present invention and prior practices may be better illustrated.

EXAMPLE 1

A batch of beryllium oxide powder of an average particle size of 5 $\mu$m and lithium hydroxide in an aqueous solution in a concentration of 8 wt. % was blended into a homogeneous mixture containing 99.5 wt. % beryllium oxide and lithium hydroxide equivalent to 0.5 wt. % lithium oxide. After the blend was formed, it was flooded with excess carbon dioxide gas by bubbling the gas through the blend for approximately 120 minutes. The carbon dioxide flooding converted the lithium hydroxide on the surface of the 20 beryllium oxide particles in situ to lithium carbonate. One thousand grams of the resulting damp beryllium-lithium carbonate blend was loaded into the die cavity of a double-acting graphite die assembly having an inside diameter of 10.2 centimeters. The loaded die assembly was placed in a hot-press furnace and a 25 pressure of 5.3 MPa was applied and held constant while the temperature of the die assembly was increased to 1000° C. at a rate of about 300° C./hr. The sintering of the beryllium oxide was determined by observing and recording the travel of the hydraulic ram utilized in the die assembly as the temperature was increased. As shown in FIG. 1, the ram travel and temperature were plotted as a function of time during the formation of a compact having a final bulk density of 3.0 g/cm$^3$.

EXAMPLE 2

Figure 2:
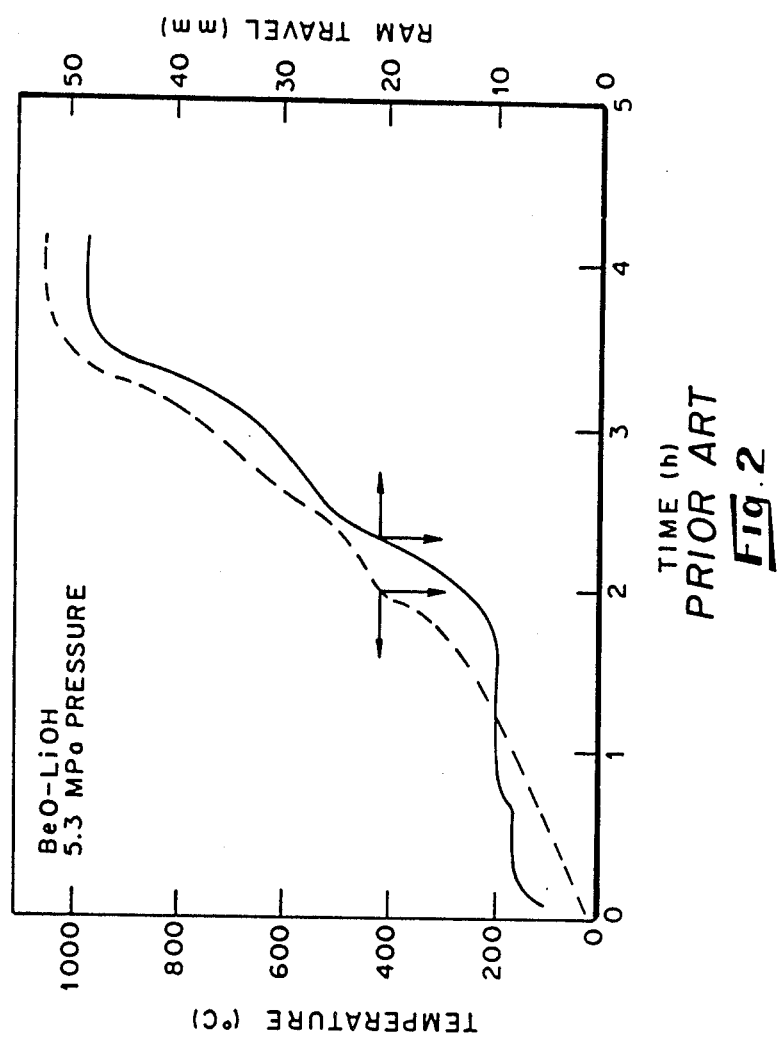
FIG. 2 is a graph of data for a pressure-sintering operation of a beryllium-lithium hydroxide mixture as previously practiced.

One thousand grams of a mixture containing 99.5 wt. % beryllium oxide powder of an average particle size of 5 $\mu$m and a lithium hydroxide content equivalent to 0.5 wt. % of lithium hydroxide was prepared as in Example 1 and then loaded into the cavity of a double-acting graphite die assembly similar to that used in Example 1. The loaded die assembly was placed in a hot press furnace and a pressure of 5.3 MPa was applied to the die assembly and held constant while the temperature was increased to 1000° C. at the same rate as in Example 1. The sintering of the material was determined by observing and recording the hydraulic ram travel as the temperature increased with the ram travel and temperature being plotted as a function of time as indicated in FIG. 2. The compact resulting from the pressing in FIG. 2 had a final bulk density 2.98 g/cm$^3$.

Densification of the beryllium oxide-lithium hydroxide material in Example 2 began slowly at a temperature of about 400° C. which is slightly below the melting point of lithium hydroxide. It was expected that upon reaching this temperature that the grains of the beryllium oxide became lubricated with molten lithium hydroxide which enabled the rearrangement of beryllium oxide grains to occur within the compact under the influence of pressure. A reaction occurred at about 840° C. between the beryllium oxide and the lithium oxide resulting from the conversion of the lithium hydroxide and then the rate of densification increased until the densification was almost complete as shown by the solid line in FIG. 2.

On the other hand, in the practice of the present invention the densification of a beryllium oxide-lithium carbonate mixture is significantly different in a pressure-sintering operation at a constant pressure in that no apparent densification occurs in the beryllium oxide-lithium carbonate mixture until the mixture reaches a temperature of 723° C. which is the melting point of lithium carbonate. Once this temperature is obtained, the beryllium oxide rapidly sinters and the ram moves relatively rapidly to provide high densification. The profile of this ram displacement is illustrated in FIG. 1. An examination of hot pressed disks as prepared in Example 1 indicates that the problems due to density gradients have been essentially solved by the conversion of the soluble and mobile lithium hydroxide to the immobile and insoluble lithium carbonate prior to the hot pressing operation while retaining the qualities provided by the lithium oxide sintering agent.

We claim:

1. A method for preparing an article of beryllium oxide by hot pressing comprising the steps of forming a homogeneous mixture of about 98.5 to 99.5 weight percent of beryllium oxide particulates and sufficient lithium hydroxide in an aqueous solution to provide about 0.25 to 1.5 weight percent equivalent of lithium oxide, contacting the mixture with carbon dioxide for a sufficient duration to convert in situ essentially all the lithium hydroxide to lithium carbonate, and thereafter hot pressing the mixture into an article of desired configuration of near theoretical density, said hot pressing step being characterized by the lithium carbonate being uniformly dispersed throughout the mixture and affixed to the beryllium oxide particulates and converting to lithium oxide during the hot pressing step to provide essentially uniform sintering of the beryllium oxide particulates for providing the article with essentially uniform density.

2. The method for preparing an article of beryllium oxide as claimed in claim 1, wherein the beryllium oxide particulates are in a size range of about 0.1 to 10 $\mu$m, and wherein the lithium hydroxide in the aqueous solution is in a concentration of about 4 to 18 wt. %.

3. The method for preparing an article of beryllium oxide is claimed in claim 2, wherein the hot pressing step is achieved at a temperature in the range of about 950° to 1050° C. and at a pressure in the range of about 5 to 10 MPa.

4. The method for preparing an article of beryllium oxide as claimed in claim 2, wherein the mixture is flooded with excess carbon dioxide for a duration in the range of about 30 to 120 minutes for converting the lithium hydroxide to lithium carbonate.

* * * * *